Oct. 1, 1957 W. E. KOCK 2,808,584
DIRECTIONAL RADIATOR
Filed Jan. 29, 1954 2 Sheets-Sheet 1
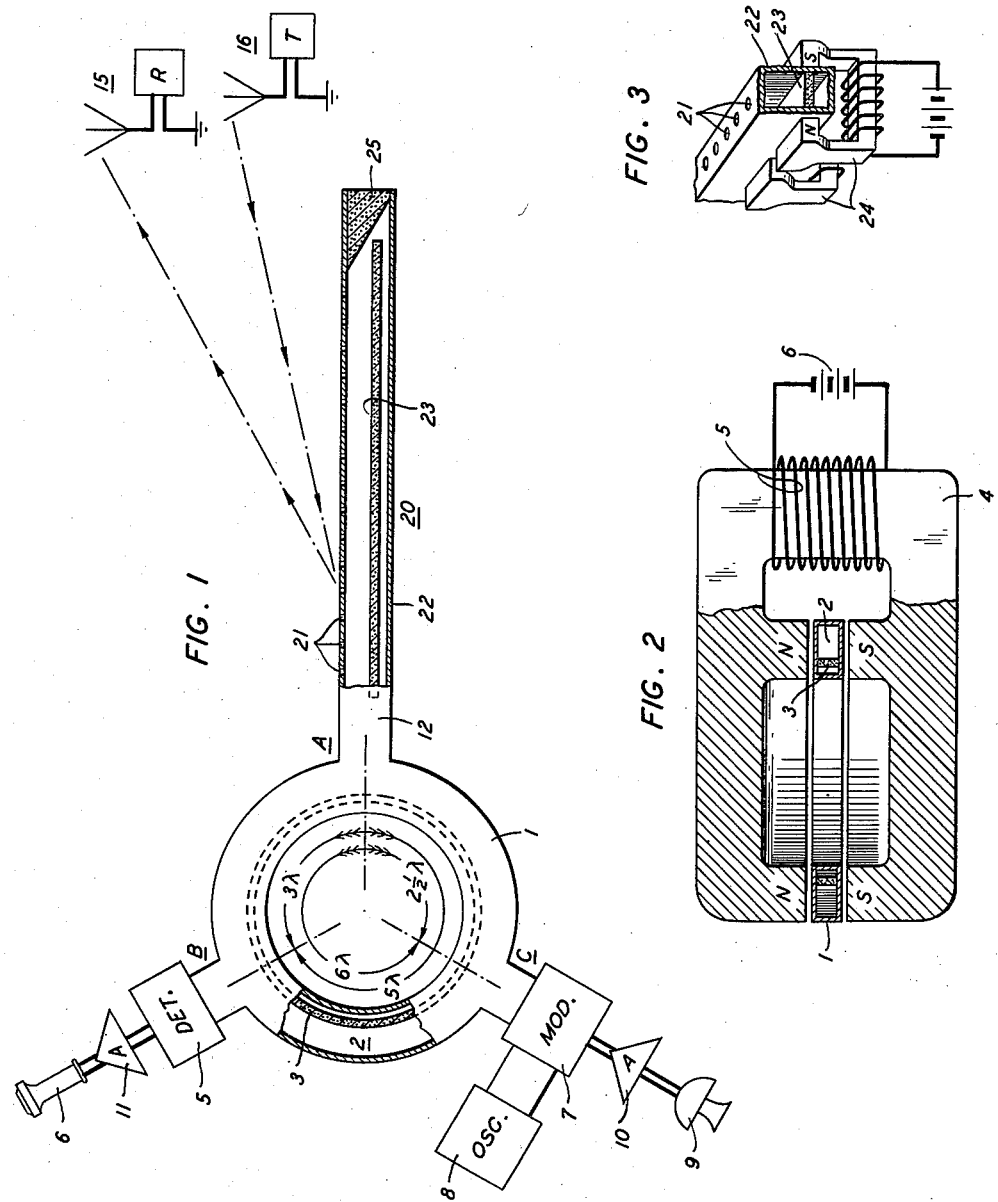
INVENTOR
W. E. KOCK
BY
Harry C. Hart
ATTORNEY Oct. 1, 1957  W. E. KOCK  2,808,584
DIRECTIONAL RADIATOR
Filed Jan. 29, 1954  2 Sheets-Sheet 2
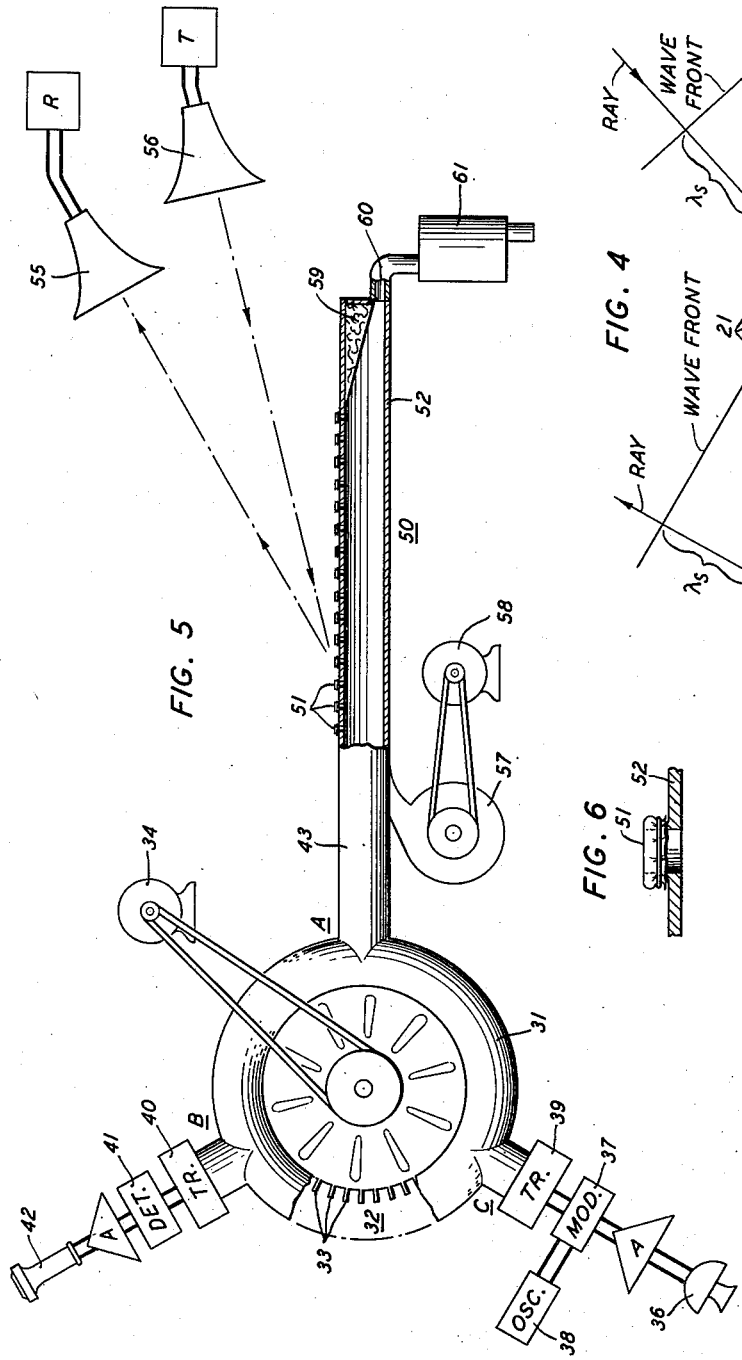
INVENTOR
W. E. KOCK
BY
Harry C. Hart
ATTORNEY

United States Patent Office 2,808,584
Patented Oct. 1, 1957

2,808,584
DIRECTIONAL RADIATOR

Winston E. Kock, Basking Ridge, N. J., assignor to Bell Telephone Laboratories, Incorporated, New York, N. Y., a corporation of New York Application January 29, 1954, Serial No. 406,976

14 Claims. (Cl. 343—768)

This invention relates to apparatus and methods for the directional transmission and reception of radiant wave energy.

The principal object of the invention is to disassociate the directional characteristic of such apparatus as a transmitting antenna from its directional characteristic as a receiving antenna. A related object is to provide for the individual and separate control of these two characteristics.

Another object of the invention is to decouple incoming wave energy from outgoing wave energy. More specifically, an object is to provide apparatus which, while highly effective as a radiator of wave energy in a prescribed direction, is insensitive to, and therefore not subject to interference by, wave energy originating elsewhere which may reach it from the same direction.

When a wave-supporting structure such as a hyperfrequency electromagnetic wave guide or pipe is provided with a row of apertures in one of its walls, each such aperture constitutes a point source of radiation. By reason of constructive and destructive interference which takes place between the rays from the several apertures, the row of apertures taken together radiate energy in a complicated pattern. When the guiding structure is energized by waves which advance in only one direction within it, this pattern becomes a narrow beam of energy which is radiated away from the device at an angle that depends on the propagation speeds of the wave energy within the guiding structure and outside of it, in free space. Similarly, wave energy incoming from a distant point along a path which makes a preferred angle with the axis of the device stimulates each of the apertures in turn and generates a wave within the device. The direction of greatest sensitivity to such incoming wave energy is that at which the energy reaches the successive apertures at the same instants as the wave traveling in the guide reaches them on the inside. Such "leaky pipe" radiators form the subject of W. P. Mason Patents 2,408,435 and 2,406,391. They are also shown and discussed, both as to their structure and mode of operation, in "Principles and Applications of Waveguide Transmission" by G. C. Southworth (Van Nostrand 1950), especially in section 10.2 of chapter X.

It has recently been discovered that when a strip of ferrite material is placed within a wave guide structure, e. g., one of rectangular cross section and extending lengthwise of the structure, parallel with its shorter side and offset from the center of the cross section, and when to this ferrite strip there is applied a steady magnetic field, then the wave propagation speed or phase velocity in the guide differs for the two directions of transmission, being increased in one direction and diminished in the other direction as compared with its magnitude in the absence of the ferrite and the field. This nonreciprocal phase velocity feature of ferrite-bearing wave guides is discussed by J. H. Rowan in the Bell System Technical Journal for November, 1953, vol. 32, page 1333. Certain practical applications and uses of this phenomenon are disclosed in an application of S. E. Miller, Serial No. 362,193, filed June 17, 1953.

In accordance with the present invention, the leaky pipe radiator of the prior art is modified by the introduction of phase velocities which differ for the two directions of wave propagation within it. In a guide for hyperfrequency electromagnetic waves, these unequal phase velocities are secured by the introduction into the guide of an off-center strip of ferrite material and the application of a steady magnetic field thereto. In the case of a guide for compression waves in a fluid medium such as air, the unequal phase velocities are secured by the bodily transport of the wave-supporting medium in one direction; e. g., by the introduction into the guide of a steady current of air.

Because the direction of greatest sensitivity of a leaky pipe radiator or absorber depends on the phase velocity of the wave motion within it, the generation of unequal phase velocities in the two directions makes for directional sensitivities of the apparatus at two different angles with respect to its axis, one holding for transmission and the other for absorption or reception. The apparatus of the invention thus makes for transmission of radiated energy along a narrow beam, and therefore with high efficiency, toward a distant point and at the same time reduced sensitivity of the apparatus to incoming radiation from the same direction, and high sensitivity to incoming wave energy arriving from a different direction.

The invention will be fully apprehended by reference to the following detailed description of preferred illustrative embodiments thereof taken in connection with the appended drawings, in which:

Fig. 1 is a schematic diagram showing a hyperfrequency electromagnetic leaky wave guide structure embodying the nonreciprocal phase velocity feature of the invention;

Figs. 2 and 3 are diagrams showing apparatus for applying a steady magnetic field to the several parts of the apparatus of Fig. 1, thus endowing them with the nonreciprocal phase velocity feature of the invention;

Fig. 4 is an explanatory diagram including a Huyghens wavelet construction;

Fig. 5 shows an acoustical counterpart of the apparatus of Fig. 1 employed in a compression wave telephone system;

Fig. 6 shows a detail of the radiator of Fig. 5; and

Fig. 7 shows the combination of a nonreciprocal phase velocity leaky guide radiator with a wave reflector.

Referring now to the drawings, Fig. 1 shows a reentrant wave-guiding structure 1 defining a closed loop path 2 for wave energy within it. This structure is preferably of a cross section which, though rectangular, is not square, i. e., its cross section has two shorter sides and two longer sides. A strip 3 of ferrite material is placed within the wave guide structure and offset from the center of the cross section. For guided waves of the dominant mode, this strip is arranged parallel to the shorter sides of the wave guide structure and connected at its opposite edges to the longer sides. Preferably, its separation from the shorter sides is maintained constant throughout the closed loop. In operation, a steady magnetic field is applied to this ferrite material in the direction perpendicular to its length and perpendicular to its shortest dimension, i. e., in a direction parallel with the axis of the closed loop. Fig. 2 shows one simple means for applying the magnetic field in the required fashion, namely, by the provision of an electromagnet 4 having two oppositely disposed pole pieces, each of which is shaped as by machining to a form the same as that of the wave guide structure 1. When the wave guide structure is placed between the poles and when the magnet is energized as by a coil 5 and a current source 6, the magnetic flux has the required configuration. The ferrite material itself, of which the strip is made, may be of any suitable variety. Materials having the necessary properties are discussed in the publication referred to above and in the footnotes thereto.

The re-entrant wave guide structure of Fig. 1 is provided with three ports A, B and C, which gives access to the closed path by way of apertures in the outer short side of the re-entrant wave guide structure. These ports are equally spaced apart in the electrical sense. As illustrated, they are also equally spaced apart, namely, by 120 degrees, in the geometrical sense, although this is principally for the sake of simplicity of illustration, and is not essential.

With any particular combination of the material and dimensions of the ferrite strip 3 and the strength of the magnetic field applied to it, the re-entrant wave-guiding structure 1 of Fig. 1 is characterized by two different phase velocities for waves progressing around the closed path within it. One of these phase velocities exceeds the normal phase velocity $v_0$, which would obtain within the guide without the ferrite and the field, by the phase velocity differential $\Delta v$. The other is reduced as compared with $v_0$ by the same amount. The effect of such phase velocity differential is to elongate the length $\lambda$ of a wave progressing around the closed path 2 in one direction, in the present illustration the clockwise direction, and to shorten the length of a wave of the same frequency progressing around the path in the opposite direction. Given a desired frequency of operation, the phase velocity differential may be adjusted, as by controlling the strength of the magnetic field, to a magnetic such that the number of wavelengths in one angular direction embraced within the closed loop path 2 differs from the number of wavelengths in the opposite angular direction embraced within the closed loop path by an odd number of half wavelengths. In the present example, the closed path embraces nine full wavelengths in the counterclockwise direction and seven and one-half wavelengths in the clockwise direction.

Various other phase velocity and wavelength relations around the closed path as a whole are possible. They are succinctly stated by the following equation for the possible values of the differential phase velocity:

$$\frac{\Delta \lambda}{\lambda} = \frac{\Delta v}{v_0} = \frac{2m-n}{2m+n}$$

where $m$ is any integer
$n$ is any odd integer

Under these conditions, consider the operation when energy of this frequency is applied at the port A and so obtains access to the closed path. It travels around the loop 2 in both directions, its waves being elongated in the clockwise direction and shortened in the counterclockwise direction. It reaches the port B after traveling for three full wavelengths in the counterclockwise direction and five full wavelengths in the clockwise direction. The energies reaching the port B by these two paths thus appear at the port B in phase coincidence, i. e., they are in additive relation, thus in effect making for a source of energy at this point of the closed path. They therefore tend to proceed outward through the port B and to whatever impedance element or network may be connected thereto. Thus, a source connected to the port A and a load connected to the port B have been effectively coupled together.

The same energy, entering the closed path by the port A, travels in both directions around the loop to the port C. In following the counterclockwise path, it arrives there after six full wavelengths; in following the clockwise path it arrives there after two and one-half wavelengths. The two waves which arrive at the port C by these two paths are thus in phase opposition, and from the standpoint of apparatus connected to the port C, tend to cancel one another. There is thus no substantial transmission from A to C, and apparatus connected to the port A has been effectively decoupled from apparatus connected to the port C. The apparatus of Fig. 1 may thus appropriately be designated an "electromagnetic microwave isolator."

The nonreciprocal phase velocity isolator may advantageously be turned to account in an electromagnetic wave telephone transmission system, e. g., in the fashion shown in the figure. Here the A port of the re-entrant wave guide structure is connected to a conventional hyperfrequency wave guide 12, the B port is connected by way of a detector 5 to a telephone receiver 6, and the C port is connected by way of a modulator 7, energized by a high frequency oscillator 8, to a telephone transmitter 9. Amplifiers 10, 11 are connected in conventional fashion in tandem with the transmitter 9 and the receiver 6. In operation, a signal to be transmitted to a distant station 15, and originating, for example, at the transmitter 9, is modulated on hyperfrequency waves which may be generated by the conventional high frequency oscillator 8 and are introduced into the C port. The wave energy travels around the closed path 2 in both directions. By reason of the unequal phase velocities in the two directions, the energy arriving at the A port by way of each of these two paths may be brought into phase coincidence with that arriving by way of the other so that the telephone transmitter 9 is effectively coupled to the outgoing wave guide 12. Likewise, incoming energy which may originate at another remote station 16 finds access to the closed path 2 at the A port and emerges at the B port where, after detection, it is delivered to the telephone receiver 6. In each case, the desired transmission from the telephone transmitter 9 to the guide 12 or from the guide 12 to the telephone receiver 6 is exclusive of undesired coupling to the other one of these two elements, and this result is achieved without resort to any dummy load such as the balancing net which is required with a conventional hybrid structure.

The energy outgoing on the conventional hyperfrequency wave guide 12 may be transmitted to the remote station 15 by way of a leaky guide radiator 20, modified in accordance with the invention. It is shown as taking place by radiation from a number of apertures 21 in one wall of a rectilinear wave guide structure 22 which may be equally spaced apart lengthwise of the guide. In accordance with the present invention, the wave guide structure 22 is provided with a strip 23 of ferrite material which extends between its two longer sides, parallel with its shorter sides and unequally separated therefrom, and the latter is subjected to the influence of a steady magnetic field as by locating it between the poles of electromagnets 24 (Fig. 3). The position and construction of the ferrite strip 23 and the strength of the magnetic field determine two different phase velocities within the guide 22 for waves progressing in opposite directions within it. For a particular frequency of the energy applied thereto, these two phase velocities determine two directions of high sensitivity, one of which obtains for transmission, as to a remotely located receiver station 15, while the other obtains for reception, as from a remotely located transmitter station 16. A simplified Huyghens wavelet construction, showing how the two directions of principal sensitivity depend on the wave propagation speed within the guide, is reproduced in Fig. 4.

To ensure that the apertured wave guide shall carry principally traveling waves and that the wave pattern within it shall not form standing waves, its remote end is preferably terminated in an absorbing impedance element 25 and its near end termination is preferably such as to effect a substantial impedance match with the re-entrant structure 1 at the A port.

It is sometimes desired to carry on a two-way conversation from a local telephone transmitter to a distant receiver by way of a high frequency beam of acoustic compression waves. Fig. 5 shows such a compression wave transmission system. The situation depicted introduces the problem of undesired acoustic coupling between the local transmitter and the local receiver. As in the case of electromagnetic waves, this problem may be solved by employment of a nonreciprocal phase velocity isolator, namely an acoustical counterpart of the isolator of Fig. 1. Here a pipe 31 of any desired cross-sectional form, adapted to support compression wave energy in a fluid such as air, is returned on itself to form a closed path. It is provided with three ports, identified as A, B and C. To achieve the required inequality of phase velocities in two opposite angular directions around the closed path, a current of air is caused to flow around it in one direction. To this end a paddle wheel or turbine may be mounted centrally of the path whose periphery bears vanes 33 which extend through the pipe wall into its interior to move the air therein at a speed which may be adjusted to the required value by control of a driving motor 34. The considerations of addition and subtraction of wave energy at the several ports are identical with those which hold with respect to Fig. 1, provided only that the air stream speed be appropriately coordinated with the frequency of the wave energy. With this proviso, wave energy entering the structure by way of the A port emerges at the B port; energy entering by way of the B port emerges at the C port; and energy entering at the C port emerges at the A port.

The electrical output of a telephone transmitter 36 carrying electric signals of voice frequencies may be amplified and applied to a modulator 37 which modulates them onto carrier frequency oscillations derived from a source 38. The resulting modulated oscillations are converted into compression waves by a transducer 39 and introduced into the re-entrant wave guide structure 31 at the C port. Similarly, high frequency compression wave energy within the re-entrant structure 31 may be withdrawn at the B port, converted into voice-modulated electrical oscillations by a transducer 40, whereupon a detector 41 may pick out the modulations and supply them as audio signals to a reproducer 42. The A port is coupled directly and without any transducer to a pipe 43 which in turn is coupled to a leaky pipe radiator 50, comprising a pipe 52 having spaced apertures 51 in its wall. As in the case of the electromagnetic radiator 20 of Fig. 1, the leaky pipe radiator 50, a fully reciprocal form of which is shown in Mason Patent 2,406,391, radiates directionally to a receiver 55 at an angle determined by the propagation speed of compression waves within the guide. In accordance with the present invention, an air current is caused to flow within the guide 52 as by the coupling thereto of a centrifugal blower 57 driven by a motor 58. The air current thus flows from left to right in the pipe 52 and this makes for a wave propagation speed within the pipe which, for the left-right direction, exceeds the speed of sound in still air, and which is diminished, as compared with the speed of sound in still air, for propagation in the right-to-left direction. These unequal phase velocities make for greatest transmitted power in one direction, for example, toward the receiver station 55, and for greatest sensitivity to incoming compression waves arriving from another direction, for example, from the transmitter station 56.

As in the case of the electromagnetic system of Fig. 4, the impedance of the leaky pipe radiator 50 is preferably matched in well known fashion to that of the closed path 32. In addition, the leaky pipe radiator is preferably terminated at its far end by an absorptive impedance element 59 to provide a minimum of reflection at that point and thus to avoid the setting up of standing waves within it. It may be provided with a leak 60 and a muffler 61 to permit escape of the steady air current while retaining the energy of vibration. Contrariwise, the apertures 51 may be provided with yielding caps as shown in Fig. 6 to prevent the escape of steady air currents therefrom while permitting the radiation of vibratory acoustic energy.

The directional selectivity of the nonreciprocal phase velocity leaky guide radiator of the invention may be accentuated by the employment therewith of an additional element such as a lens or reflector which acts to gather its radiated energy and direct it to a selected distant point, or vice versa. Fig. 7 shows such a system employing a dish reflector 65, at approximately the focal point of which a pair of leaky guide electromagnetic microwave radiators 66 are mounted. Each of these may be as described above and shown in Fig. 1, being supplied with microwave energy from a source 67 modulated by the output of a telephone transmitter 68. They may be arranged at an angle from each other with their radiating apertures facing inward as shown so that their radiated energy beams are directed toward the dished reflector 65. The reflector operates to redirect the energy in the reverse direction toward a desired distant point and with a high degree of sharpness. With proper coordination, in accordance with the principles of the invention, between the frequency of the applied wave energy and the strength of the magnetic field, the direction of high sensitivity for incoming wave energy may be caused to lie beyond the periphery of the reflecting dish 65. Hence the system as a whole is insensitive to incoming wave energy originating in the general neighborhood of the distant point which might cause interference with communication. With an appropriate readjustment of the controlling parameters, the apparatus acts as a sensitive receiver for energy originating on the axis of the reflector 65 and as a radiator of its own energy in a different direction.

The enhancement of directionality achieved by way of the reflector of Fig. 7 is equally applicable to an acoustic compression wave system such as that of Fig. 5.

The invention, which has been illustrated by way of two different kinds of wave phenomena, is in principle applicable to guided waves of any description provided only that suitable means are at hand for adjusting their phase velocities in opposite directions of transmission to two different values. It is applicable, for example, to leaky guide radiators of forms other than those shown and described herein for illustrative purposes.

What is claimed is:

1. Apparatus for transmitting waves in one direction and for receiving waves from another direction, which comprises an elongated wave-guiding structure, a plurality of means spaced apart along the length of said structure for radiating outward from said structure the energy of waves guided by said structure, means for establishing within said guiding structure a phase velocity of one magnitude for waves advancing in one direction and a phase velocity of a different magnitude for waves advancing in the opposite direction, and means for introducing wave energy of a preassigned frequency into said guiding structure, said frequency being so coordinated with one of said phase velocities that wave energy of said frequency is radiated from said radiating means in a preassigned direction, whereby said apparatus is insensitive to waves received from said preassigned direction.

2. Apparatus as defined in claim 1 wherein the wave energy introducing means is coupled to one end of said elongated wave-guiding structure.

3. In combination with apparatus as defined in claim 2, a wave energy absorbing element coupled to the opposite end of said elongated wave-guiding structure.

4. Apparatus as defined in claim 1 wherein the wave-guiding structure is a hyperfrequency electromagnetic wave guide.

5. Apparatus as defined in claim 4 wherein the means for establishing said unequal phase velocities comprises a strip of ferrite material located within said wave-guiding structure and means for subjecting said strip to a magnetic flux.

6. Apparatus as defined in claim 4 wherein said wave-guiding structure is of rectangular cross section having two longer sides and two shorter sides.

7. Apparatus as defined in claim 6 wherein the means for establishing the unequal phase velocities comprises a strip of ferrite material extending lengthwise substantially throughout the length of said wave-guiding structure and sidewise from one of said longer sides of said wave-guiding structure to the other of said longer sides, and located at unequal distances from said shorter sides.

8. Apparatus as defined in claim 7 wherein the wave energy introducing means is coupled to one end of said elongated wave-guiding structure.

9. In combination with apparatus as defined in claim 8, a wave energy absorbing element coupled to the opposite end of said elongated wave-guiding structure.

10. Apparatus as defined in claim 1 wherein the waves which are propagated within the elongated guiding structure are fluid compression waves.

11. Apparatus as defined in claim 10 wherein the unequal phase velocities for said compression waves are secured by the movement of a current of air in one longitudinal direction within said guiding structure.

12. Apparatus as defined in claim 11 wherein the wave energy introducing means is coupled to one end of said elongated wave-guiding structure.

13. In combination with apparatus as defined in claim 12, a wave energy absorbing element coupled to the opposite end of said elongated wave-guiding structure.

14. Apparatus for transmitting electromagnetic waves in one direction and for receiving said waves from another direction which comprises an elongated hyperfrequency electromagnetic wave-guiding structure, a plurality of apertures spaced apart along the length of said structure, each of said apertures providing a communication path for electromagnetic wave energy between a wave-supporting medium in the interior of said structure and a similar medium external to said structure, means for introducing electromagnetic energy of a preassigned frequency into one end of said structure, a strip of ferrite material asymmetrically located within said structure, and means for subjecting said strip to a magnetic flux, thereby to establish within said structure a phase velocity of one magnitude for waves advancing in one direction and a phase velocity of a different magnitude for waves advancing in the opposite direction, whereby energy of said hyperfrequency is radiated from said apertures in a preassigned direction and whereby said apparatus is insensitive to waves of said frequency received from said preassigned direction.

References Cited in the file of this patent

UNITED STATES PATENTS

| | | |
|---|---|---|
| 2,210,415 | Kellogg | Aug. 6, 1940 |
| 2,274,262 | Wolff | Feb. 24, 1942 |
| 2,408,435 | Mason | Oct. 1, 1946 |
| 2,641,702 | Cohen et al. | June 9, 1953 |
| 2,659,817 | Cutler | Nov. 17, 1953 |